(12) United States Patent
Schneider et al.

(10) Patent No.: US 10,046,541 B2
(45) Date of Patent: Aug. 14, 2018

(54) OBJECT WITH SELECTABLE ADHESION

(71) Applicant: Leibniz-Institut fuer Neue Materialien gemeinnuetzige GmbH, Saarbruecken (DE)

(72) Inventors: Andreas Simon Schneider, Saarbruecken (DE); Elmar Kroner, Saarbruecken (DE); Jessica Kaiser, Saarbruecken (DE); Mareike Frensemeier, Saarbruecken (DE); Eduard Arzt, Saarbruecken (DE)

(73) Assignee: Leibniz-Institut fuer Neue Materialien gemeinnuetzige GmbH, Saarbruecken (DE)

( * ) Notice: Subject to any disclaimer, the term of this patent is extended or adjusted under 35 U.S.C. 154(b) by 271 days.

(21) Appl. No.: 14/652,143

(22) PCT Filed: Dec. 19, 2013

(86) PCT No.: PCT/EP2013/077324
§ 371 (c)(1),
(2) Date: Jun. 15, 2015

(87) PCT Pub. No.: WO2014/096158
PCT Pub. Date: Jun. 26, 2014

(65) Prior Publication Data
US 2015/0344755 A1     Dec. 3, 2015

(30) Foreign Application Priority Data
Dec. 21, 2012    (DE) .......... 10 2012 112 965

(51) Int. Cl.
*B32B 7/06*       (2006.01)
*C09J 183/06*    (2006.01)
(Continued)

(52) U.S. Cl.
CPC ............ *B32B 7/06* (2013.01); *B32B 15/08* (2013.01); *B32B 17/061* (2013.01); *C09J 5/00* (2013.01);
(Continued)

(58) Field of Classification Search
CPC .............. C09J 2205/302; B32B 7/06; B32B 2307/748; Y10T 428/2813
See application file for complete search history.

(56) References Cited

U.S. PATENT DOCUMENTS 5,888,650 A * 3/1999 Calhoun ............ C09J 7/0246
428/354
5,889,118 A    3/1999 Delgado et al.
(Continued)

FOREIGN PATENT DOCUMENTS

DE    102009037739 A1    12/2010
DE    102010034954 A1    4/2011
(Continued)

OTHER PUBLICATIONS

Liu et al., "Review of progress in shape-memory polymers", Journal of Materials Chemistry, Royal Society of Chemistry, published Mar. 19, 2007, pp. 1543-1558, Accessed Jul. 6, 2017.*
(Continued)

*Primary Examiner* — Maria Veronica Ewald
*Assistant Examiner* — Zachary M Davis
(74) *Attorney, Agent, or Firm* — Cahn & Samuels, LLP

(57) ABSTRACT

A surface with selectable adhesion is achieved by a shape memory alloy that is at least partly coated with a polymer forming a surface structure, thus allowing the adhesion force of the surface to be controlled.

16 Claims, 8 Drawing Sheets

(51) Int. Cl.
  *B32B 17/06* (2006.01)
  *C09J 5/00* (2006.01)
  *C09J 5/06* (2006.01)
  *B32B 15/08* (2006.01)

(52) U.S. Cl.
  CPC ............... *C09J 5/06* (2013.01); *C09J 183/06* (2013.01); *B32B 2307/748* (2013.01); *C09J 2205/302* (2013.01); *C09J 2483/003* (2013.01); *Y10T 428/24545* (2015.01); *Y10T 428/265* (2015.01); *Y10T 428/2813* (2015.01); *Y10T 428/2857* (2015.01)

(56) References Cited

U.S. PATENT DOCUMENTS

| | | | |
|---|---|---|---|
| 6,024,907 A * | 2/2000 | Jagunich | B29C 37/0003 264/210.2 |
| 6,773,535 B1 | 8/2004 | Wetzel | |
| 8,266,938 B2 | 8/2012 | Bradley et al. | |
| 8,592,034 B2 | 11/2013 | Rule et al. | |
| 2004/0175555 A1 | 9/2004 | Ogisu | |
| 2008/0202637 A1 | 8/2008 | Hector et al. | |
| 2011/0048096 A1 | 3/2011 | Bradley et al. | |
| 2011/0300358 A1 | 12/2011 | Blohowiak et al. | |
| 2012/0101567 A1 | 4/2012 | Jansen | |

FOREIGN PATENT DOCUMENTS

| | | |
|---|---|---|
| JP | S58018934 U | 2/1983 |
| JP | H04309583 A | 11/1992 |
| JP | H06123040 A | 5/1994 |
| JP | 2000334888 A | 12/2000 |
| JP | 2004262191 A | 9/2004 |
| JP | 2012530006 A | 11/2012 |

OTHER PUBLICATIONS

Lin et al., "Mechanically tunable dry adhesive from wrinkled elastomers", 2008, Soft Matter, pp. 1830-1835 (Year: 2008).*
Wilkes et al., "The Fatigue Behavior of Shape-Memory Alloys", 2000, JOM, pp. 45-51 (Year: 2000).*
English Abstract of DE 102010034954.
English Abstract of DE 102009037739.
International Preliminary Report on Patentability, dated Jul. 2, 2015.
English Abstract of JP 2000334888, Dec. 5, 2000.
English Abstract of JP 2004262191, Sep. 24, 2004.
English Abstract of JP H06123040, May 6, 1994.
English Abstract of JP H04309583, Nov. 2, 1992.
Partial Machine Translation of JP S58018934, Feb. 5, 1983.

* cited by examiner

OBJECT WITH SELECTABLE ADHESION

This patent application is a U.S. national stage application of PCT international application PCT/EP2013/077324 filed on 19 Dec. 2013 and claims priority of German patent document DE 10 2012 112 965.7 filed on 21 Dec. 2012, the entirety of which is incorporated herein by reference.

FIELD OF THE INVENTION

The present invention relates to an article having at least one surface having switchable adhesion.

BACKGROUND OF INVENTION

The bonding together of various surfaces by adhesion plays an important part in the formation of assemblies of materials. One concern here is that bonds are often only very difficult to undo again. This is often associated with the dissolution or destruction of the bonding layer.

Another possible way to bond surfaces together is via their dry adhesivity. Dry adhesivity herein is to be understood as meaning the formation of adhesion forces between the surfaces without adhesion-promoting materials, such as adhesive materials. Bonds of this type are also notable for being removable without residues.

Bonded systems of this type are frequently reliant on the surface evincing some structuring. However, a distinction must be made here between systems requiring a specific counter-structure, for example hooks and eyelets, and systems capable of developing adhesion forces with any desired surfaces.

Bonded systems of this type are also known for example in nature, as in the case of gecko or insect legs for example. It is believed that the bonding forces in systems of this type are based on van der Waals forces. The surface structuring in these systems leads to a very much larger area of contact and hence also to a very much higher level of adhesion forces being developed on contact.

In dry adhesivity, the magnitude of adhesion between two surfaces depends on the area available for adhesion. Two planar surfaces accordingly adhere to each other to distinctly better effect than one planar surface and one rough or nonplanar surface. The general rule is that the greater the area available for adhesion, the better the adherence between two surfaces.

However, this area is generally unalterable, so the adhesion force of a surface is generally not alterable.

However, materials are known from the prior art which are able to adopt different shapes as a function of external influences. Familiar materials of this type are, in particular, shape memory alloys (SMAs).

Shape memory alloys can change their crystal structure without changing their composition, and this change in crystal structure can be triggered thermally or mechanically. The change is usually triggered thermally, i.e., the shape memory alloy changes its structure on reaching a certain temperature.

Conventionally, the high temperature phase of a shape memory alloy is known as the austenite phase and the low temperature phase is known as the martensite phase. The basis for the special properties of shape memory alloys is that the ability of the two phases to transform into one another is reversible.

Two different possibilities are distinguished in this context. When an austenite article of specified shape is cooled down to below the transformation temperature, it transforms into a martensite article of the same shape. This article, then, is subsequently converted into a second shape without exceeding the critical strain of martensite (usually about 5-7%, depending on the alloy used). When this article is heated to above the transformation temperature, it transforms back into austenite and in the process readopts the original first shape. This process may also be repeated more than once. However, once again cooling the austenite article to below the transformation temperature without renewed deformation will not transform it into the second shape. This second shape is only obtainable by renewed deformation of the article. This effect is accordingly also called a "one-way shape memory effect".

Different behavior is attainable when the shape memory material is deformed plastically or treated thermomechanically. Either will create in the material a microstructure causing there to be a memory not only for the shape of the austenite article but also for the shape of the martensite article. In consequence, cooling and transforming from austenite into martensite will likewise create a shape change to the structures at the surface. This process is reversible, so changing between these two shapes is possible by heating and cooling. This effect is also called a "two-way shape memory effect".

It must be borne in mind here that the transformation of martensite into austenite need not take place at the same temperature as the transformation of austenite into martensite. Typically there will be some distinct hysteresis. In addition, the transformation takes place over a temperature range. The transformation temperatures are known as the martensite start temperature ($M_s$) and martensite finish temperature ($M_f$) and also as austenite start temperature ($A_s$) and austenite finish temperature ($A_f$), where the capital letters designate the particular transformation product. That is, if austenite is cooled, $M_s$ represents the temperature at which it will begin to transform into martensite. FIG. 1 shows a corresponding diagram. The relationship between these temperatures is therefore typically $M_f < M_s < A_s < A_f$. The temperatures can vary if the shape memory alloy is under stress. This can raise or lower the transformation temperatures.

One particular version of this reversible effect is shown by DE 2010 034 954 A1, which shows the reversible formation of elevations on a surface for information storage.

It is also known to use shape memory alloys for tack-adhered bonds (e.g., U.S. Pat. No. 6,773,535). However, there the deformation of a component part in shape memory alloy is used to weaken the tack-adhesive bond.

The production of surface structures in the micrometer region that are switchable is comparatively recent. DE 10 2010 034 954 A1 describes the production of reversibly switchable depressions or elevations. These are used to store information on the surfaces that is to become visible on heating.

Using shape memory alloys to achieve switchable adhesion of surfaces is not known.

The problem addressed by the present invention is that of providing an article having switchable adhesion.

SUMMARY OF INVENTION

The problem is solved by the inventions having the features of the independent claims. Dependent claims characterize advantageous developments of the inventions. The wording of all the claims is hereby incorporated in this description by reference. The inventions also comprehend any sensible and especially all mentioned combinations of dependent and/or independent claims.

The problem is solved by an article having at least one surface having switchable adhesion, wherein this surface comprises at least one shape memory alloy coated at least partly with at least one polymer, characterized in that the at least one shape memory alloy is capable of forming a surface structure.

The formation of the surface structure changes the surface of the article. This changes the surface area available for adhesion.

BRIEF DESCRIPTION OF THE DRAWINGS

The exemplary embodiments are schematically depicted in the figures. Like reference symbols in the individual figures refer to like or functionally like/corresponding elements. Specifically.

DETAILED DESCRIPTION OF INVENTION

Figure 1:
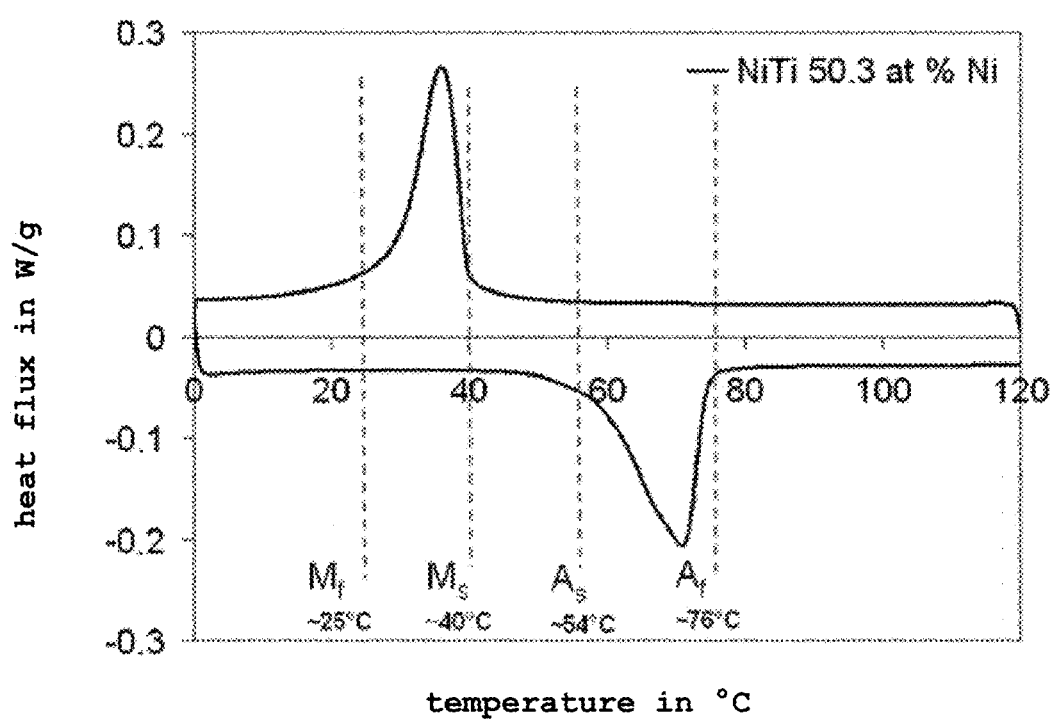
FIG. 1 shows a differential scanning calorimetry (DSC) measurement of the phase transformation of an NiTi alloy.

The adhesion in question is preferably the dry adhesivity of the surface. No adhesives are used.

The at least one shape memory alloy (SMA) may be any alloy of this type suitable for forming a surface structure.

Alloys are now known for a large temperature range. To wit, alloys having transformation temperatures between −200 and 200° C. are known. The transformation temperature is typically between 20° C. and 100° C.

Examples of such alloys are alloys of nickel and titanium, copper-zinc-aluminum alloys, copper-zinc-aluminum-nickel alloys, nickel-manganese-gallium alloys and copper-aluminum-nickel alloys. The shape memory alloy may also be ferromagnetic.

Preference is given to an alloy comprising nickel and titanium. The ratio of nickel to titanium therein may be used to raise or lower the transformation temperature. For an equimolar NiTi shape memory alloy (+/−1 mol % deviation from 1:1) the temperature at which a transformation from austenite into martensite occurs is about 35° C. ($M_s$ 40° C.; $M_f$ 25° C.; $A_s$ 54° C.; $A_f$ 76° C.).

The shape memory alloy is at least partly coated with at least one polymer. The adherability of a shape memory alloy is generally poor. As a result, the adhesion attainable to some other surface (counterface) is insufficient without a polymer coating. This is distinctly improvable by applying a suitable polymer coating. In adhesion, at least part of the polymer coating has to come into contact with the counterface.

Using a polymer layer also has the advantage that the adhesion force for a certain test surface and/or body is simple to determine. The adhesion behavior of polymers can be adapted to a counterface for a given surface structure. This is accordingly a simple way to investigate many polymers.

The polymers are preferably sufficiently elastic to transmit the surface structure of the shape memory alloy to the surface of the coating. The formation of the surface structure must not damage the polymer coating. The structure of the coating must also be able to change at the temperatures used.

The elastic modulus of the polymer is preferably less than 100 MPa, more preferably less than 10 MPa.

The glass transition temperature of the polymer is preferably below the transformation temperature of the shape memory alloy, preferably below $M_f$. The decomposition temperature of the polymer shall be above $A_f$.

Any polymers are suitable here which evince adhesion to the desired counterface and thus are able to act as adhesion promoters for dry adhesivity.

Preferred polymers are elastomers, in particular rubbers or rubber-like compounds. The list which follows gives an overview of suitable polymers. The codes are listed in line with DIN/ISO standard 1629.

The M-Group

The M-group includes rubbers having a saturated chain of the polymethylene type.

ACM Copolymers of ethyl acrylate or other acrylates with a small amount of a monomer which facilitates vulcanization.

AEM Ethylene-acrylate rubber.

ANM Copolymers of ethyl acrylate or other acrylates and acrylonitrile.

CM Chlorinated polyethylene.

CSM Chlorosulfonated polyethylene.

EPDM Terpolymers of ethylene, propylene and a diene monomer with an unsaturated portion of the diene in the side chain.

EPM Ethylene-propylene copolymers.

FPM Rubbers having fluoro, fluoroalkyl or fluoroalkoxy groups on the polymer chain.

The O-Group

This group includes rubbers having oxygen in the polymer chain.

CO Polychloromethyloxirane (epichlorohydrin rubbers).

ECO Copolymers of ethylene oxide (oxirane) and chloromethyloxirane (epichlorohydrin).

GPO Copolymers of propylene oxide and allyl glycidyl ether.

The R-Group

The R-group is defined by inserting, before the letter "R" (=rubber), one or more codes for the monomer(s) from which the rubber was prepared. The letter immediately preceding the letter "R" signifies the diolefin from which the rubber was prepared. Any letter (or letters) preceding the diolefin letter signifies the comonomer(s). The following classification is used for the R group:

ABR Acrylate-butadiene rubbers.

BR Butadiene rubbers.

CR Chloroprene rubbers.

IIR Isobutene-isoprene rubbers.

IR Isoprene rubbers, synthetic.

NBR Acrylonitrile-butadiene rubbers.

NCR Acrylonitrile-chloroprene rubbers.

NR Isoprene rubbers (natural rubbers).

PBR Vinylpyridine-butadiene rubbers.

SBR Styrene-butadiene rubbers.

SCR Styrene-chloroprene rubbers.
SIR Styrene-isoprene rubbers.
NIR Acrylonitrile-isoprene rubbers.
PSBR Vinylpyridine-styrene-butadiene rubbers.
Carboxylic rubbers are identified by the prefix letter "X":
XSBR Carboxylic styrene-butadiene rubbers.
XNBR Carboxylic acrylonitrile-butadiene rubbers.
Rubbers containing halogen on the polymer chain are classified as follows:
BIIR Bromo-isobutene-isoprene rubbers.
CIIR Chloro-isoprene rubbers.
The Q-Group
The Q-group is defined by inserting the name of the substituent on the polymer chain before the silicone designation.
MFQ Silicone rubbers having methyl and fluorine groups on the polymer chain.
MPQ Silicone rubbers having methyl and phenyl groups on the polymer chain.
MPVQ Silicone rubbers having methyl, phenyl and vinyl groups on the polymer chain.
MNQ Silicone rubbers having only methyl groups on the polymer chain, such as polydimethylsiloxane.
MQ Silicone rubber methylpolysiloxane.
MVQ Silicone rubbers having methyl and vinyl groups on the polymer chain.
The U-Group
The U-group includes rubbers having carbon, oxygen and nitrogen in the polymer chain.
AFMU Terpolymers of tetrafluoroethylene, trifluoronitrosomethane and nitrosoperfluorobutyric acid.
AU Polyester urethane rubber.
EU Polyether urethane rubbers.
It is further also possible to use the above unlisted NBR rubbers having terminal vinyl, carboxyl and amine groups or ethylene-vinyl acetates (EVA).

A person skilled in the art knows how to adapt the elasticity of the aforementioned polymers to the requirements of the invention.

Preferred polymers are organomodified silicon compounds of the Q-group, preferably silicones such as polydimethylsiloxane or polyvinylsiloxane.

Useful organic polymers further include polyisocyanates, polyepoxides, poly(meth)acrylates, polyesters or polyvinyl chloride.

The poly(meth)acrylates may be polymerized polyester, polyether, carbonate, epoxy or urethane (meth)acrylates.

The polymer coating may be applied atop the shape memory alloy in any desired manner, for example by spray coating, blade coating, dip coating or spin coating. The process of producing the polymer coating may also comprise polymerizing and/or curing the coating.

It may be necessary to pretreat the shape memory alloy, for example by plasma treatment. The coating may similarly comprehend two or more layers and/or polymers, for example in order to improve the adherence to the shape memory alloy. Inorganic coatings may also be applied, for example thin layers of metal.

The polymer coating may also contain still further constituents, for example pigments, nanoparticles, magnetic particles.

It may be necessary to adapt the polymer and/or the surface structure with regard to the dry adhesivity desired for the surface, in particular with regard to the counterface whereto the surface adheres. Preferred counterfaces have a higher modulus of elasticity than the polymer coating has. This ensures that the formation of the surface structure will result in a change in the surface area available for adhesion. The counterface cannot balance out the change due to the formation of the surface structure. So, after formation of the surface structure, less or more surface area of the counterface is in contact with the polymer coating. This changes the adhesion between the article and the counterface.

Since the magnitude of the adhesion depends on the area of contact between the polymer layer and the counterface, the counterface may be specially engineered to maximize the area of contact with the polymer coating. The counterface may be specially textured for example. But it may also be smooth, especially when the polymer coating is likewise smooth.

The counterface may consist of any desired materials. Organic or inorganic materials may be concerned, for example plastics, metals, alloys or oxidic materials such as ceramics or glasses.

Figure 2:
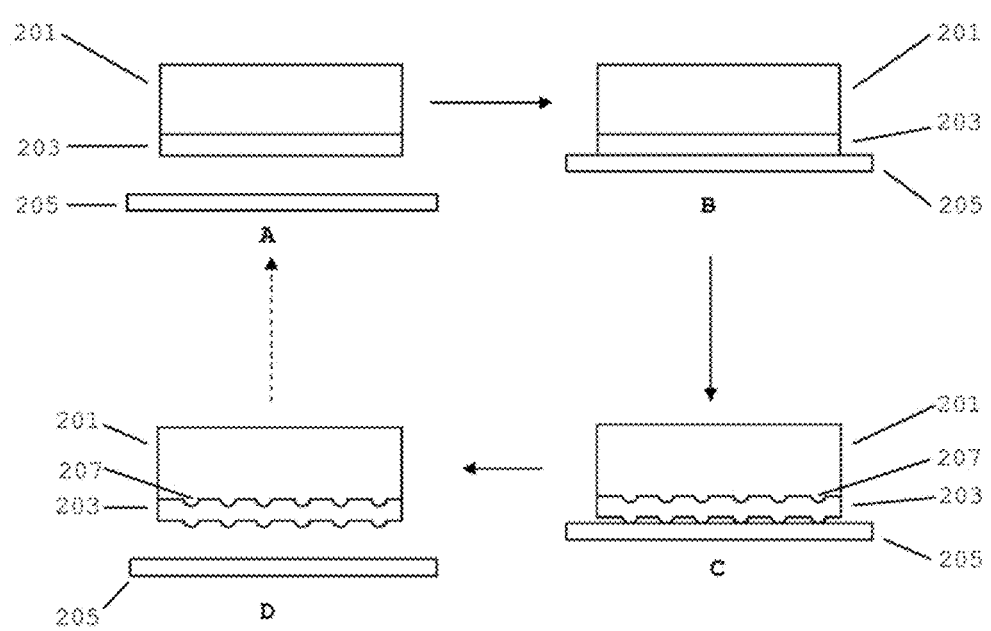
FIG. 2 shows a schematic depiction of the method of using a surface having switchable adhesion.

The shape memory alloy may develop a surface structure which changes the area available for adhesion. The shape memory alloy forms elevations or depressions when forming a surface structure. As a result, the surface of the article is elevated or depressed in these places. The elevations and depressions, if they are coated places, are also transmitted by the polymer layer. Since the structure causes the surface of the article to change, a different area is available for the adhesion to a counterface. In the case of a planar counterface and a planar surface of the article, the formation of the surface structure causes less area to be in contact with the counterface. The adhesion between the article and the counterface decreases correspondingly. It is preferable for the formation of the surface structure to reduce the area available for adhesion. In contradistinction to the gecko structures, the structuring of the surface in this case reduces the adhesion. This is also illustrated in FIG. 2.

It is also possible for the adhesion area to be at its maximum only once the surface structure has formed, for example when the shape of the counterface corresponds to that of the surface structure.

The formation of the surface structure may also consist in an existing structure disappearing.

The surface structure may take any desired shape. It may comprise elevations or depressions, which may have any desired shape. The structures may at base be circular, rectangular, linear or branched. Their arrangement on the surface may be regular or irregular. The elevations may be semispherical, conical or pyramidal in shape.

A surface structure is concerned because it is only at the surface of the shape memory alloy, and/or of any polymer layer applied thereon, that a structure is formed. Other regions of the article remain unaffected. There is more particularly no other macroscopic change to the shape memory alloy. This of course does not rule out the possibility that changes will also occur at a crystalline level within the shape memory alloy, for example crystal conversions, but they do not have any macroscopic repercussions. Apart from forming the surface structure the shape memory alloy does not, particularly, undergo any bending or size change.

The surface structure is preferably a microtexture. That is, the structure has at least one dimension of below 500 μm parallel to the surface of the article. That is, the smallest lateral dimension of the structure is below 500 μm. The smallest lateral dimension of the surface structure is preferably less than 300 μm, more preferably less than 200 μm and most preferably less than 100 μm.

The height and/or depth of the surface structure formed, in relation to the surface of the shape memory alloy, depends on the method used for producing it. Preferably the height of the surface structure formed is more than 0.5 µm, more preferably more than 0.8 µm. This requirement follows from the fact that, firstly, a certain polymer layer thickness is needed to generate adhesive properties and, secondly, that the structures must not be much smaller than the layer thickness to elicit a change in the contact area.

The height of the surface structure formed is determinable by the method of production.

The surface structure may consist of individual structural features such as round or linear elevations. These are preferably not less than 1 µm apart from each other, more preferably not less than 30 µm.

The particulars given relate to the surface of the article with the polymer coating.

The dimensions of the surface structure are measurable using scanning electron microscopy, white light interferometry, confocal optical microscopy or AFM.

The dimensions reported herein were measured using white light interferometry.

The thickness of the coating of at least one polymer needs to be adapted to the surface structure formed. To achieve an optimum between switchability and adhesion, the coating at its thickest place is preferably less than 15 µm in thickness, more preferably less than 10 µm. This ensures that, in the event of a microtexture, the structural changes of the shape memory alloy are also observable on the surface of the coating. To change the absolute values of the adhesion, the layer thickness can be varied.

Optimal layer thickness also depends on the maximum height and/or depth of the surface structure formed. The ratio between polymer coating thickness and maximum height and/or depth of the surface structure is preferably less than 50:1, more preferably less than 30:1 and most preferably less than 10:1.

The shape memory alloy may form the surface structure in a reversible manner or in an irreversible manner. This depends on the nature of the pretreatment of the shape memory alloy. It is preferable for the shape memory alloy to form the surface structure in a reversible manner. As a result, the adhesion of the surface is switchable in a reversible manner.

The formation of the surface structure is preferably triggered thermally. The shape memory alloy has a first structure at a first temperature and a second structure at a second temperature. The two structures are convertible into each other via the corresponding temperature. This may be done in a reversible manner or in an irreversible manner, preferably in a reversible manner.

It is preferable for the first temperature to be below $M_f$ and for the second temperature to be above $A_f$. Yet below the annealing temperature for the reversible shape memory effect. This ensures complete transformation of the shape memory alloy.

The article may be heated or cooled to the temperature needed for the transformation. For this, the article itself may also contain means for cooling or heating. These may be heating devices, but also heatable components, for example induction-heatable layers or particles, which are ferromagnetic for example.

In one development of the invention, the first structure of the shape memory alloy is a planar structure. The surface structure is preferably formed by elevations and/or depressions. These constitute the second structure.

The surface of the shape memory alloy is at least partly coated with at least one polymer. It is preferably at least the region which forms the surface structure which is coated.

In a further embodiment of the invention, the surface is completely coated with the polymer.

The surface structure is obtainable in various ways. The surface structure is preferably obtainable by plastic deformations such as embossing or scratching of the surface of the shape memory alloy in the martensitic state, but more preferably by indenting. Following a planarization of the previously plastically deformed surface, heating will cause structures to form at the previously deformed places. These structures disappear again on cooling. The shape of the structures is controllable via the nature of the plastic deformation. Conical, pyramidal or spherical indenters can be used. This leads to individual elevations which in their shape resemble the original indenter shape. Elongate scratches in the surface lead to elongate elevations as surface structure. More complex patterns can also be embossed into the surface in a corresponding manner. Completely reversible surface structures are obtainable with spherical indenters.

The structures are also obtainable by laser shock indentation.

The invention also relates to the method of using the article of the present invention to produce a separable dry-adhesive bond.

The article of the present invention is usable in many sectors. It may also be part of a larger article. Such controllable adhesion is important for any bonds that have to be separated under certain conditions. Component parts that are to separate at certain temperatures are an example. Switchable grippers are another.

The article of the invention, however, is also useful in other sectors where switchable surfaces are important irrespective of their adhesion force. Medical applications are one example. This may also involve the ability of cells or tissues to become established.

Switchable surfaces may also play a part in tribological applications. To wit, surface friction changes as a function of surface structure. The article of the present invention may for example form a surface structure in this way on heating by heat of friction.

Further details and features will become apparent from the description hereinbelow of preferred exemplary embodiments in conjunction with the dependent claims. The particular features may each be actualized alone or combined with one or more others. The ability to solve the problem addressed by the present invention is not confined to the exemplary embodiments. For instance, range recitations always include all—unrecited—intermediate values and all conceivable sub-intervals.

FIG. 1 shows the transformation characteristics for an NiTi alloy with 50.3 at % of nickel via a DSC analysis. The start and finish temperatures for the particular transformation can be read off the diagram. On heating, the transformation into austenite starts at about 54° C. ($A_s$) and finishes at about 76° C. ($A_f$). On cooling, the transformation into martensite starts at about 40° C. ($M_s$) and finishes at about 25° C. ($M_f$).

FIG. 2 shows a schematic process flow diagram for the method of using a surface having switchable adhesion. In the depicted scenario, the surface of the shape memory alloy (201) is completely coated with a polymer layer (203). In step A, the first structure shown for the shape memory alloy has a planar surface. The article is applied with the surface to a counterface (205) and adhesion results between the counterface (205) and the polymer layer (203) (step B). Since both the surfaces are planar, the area available for adhesion is maximal. The shape memory alloy is then converted into the second shape (step C). This is customarily accomplished by heating to a temperature above the transformation temperature of the shape memory alloy. The shape memory alloy develops a surface structure (207). The polymer layer (203) on the shape memory alloy likewise becomes structured through the formation of the surface structure (207). The surface structure in the depicted example is the formation of elevations. As a result, the surface of the article is no longer planar and the area available for adhesion to the test body and/or surface (205) is smaller. This is the case in particular when the counterface (205) is unable—because it is too stiff—to balance out the change in the surface. Smaller area causes the adhesion between the test body (205) and the article to decrease. The article takes less force to separate from the counterface (205) (step D). If the shape memory alloy can be converted back into the first shape, the original adhesion force is regained. Therefore, the adhesivity of this surface is controllable using a thermal stimulus.

Figure 3:
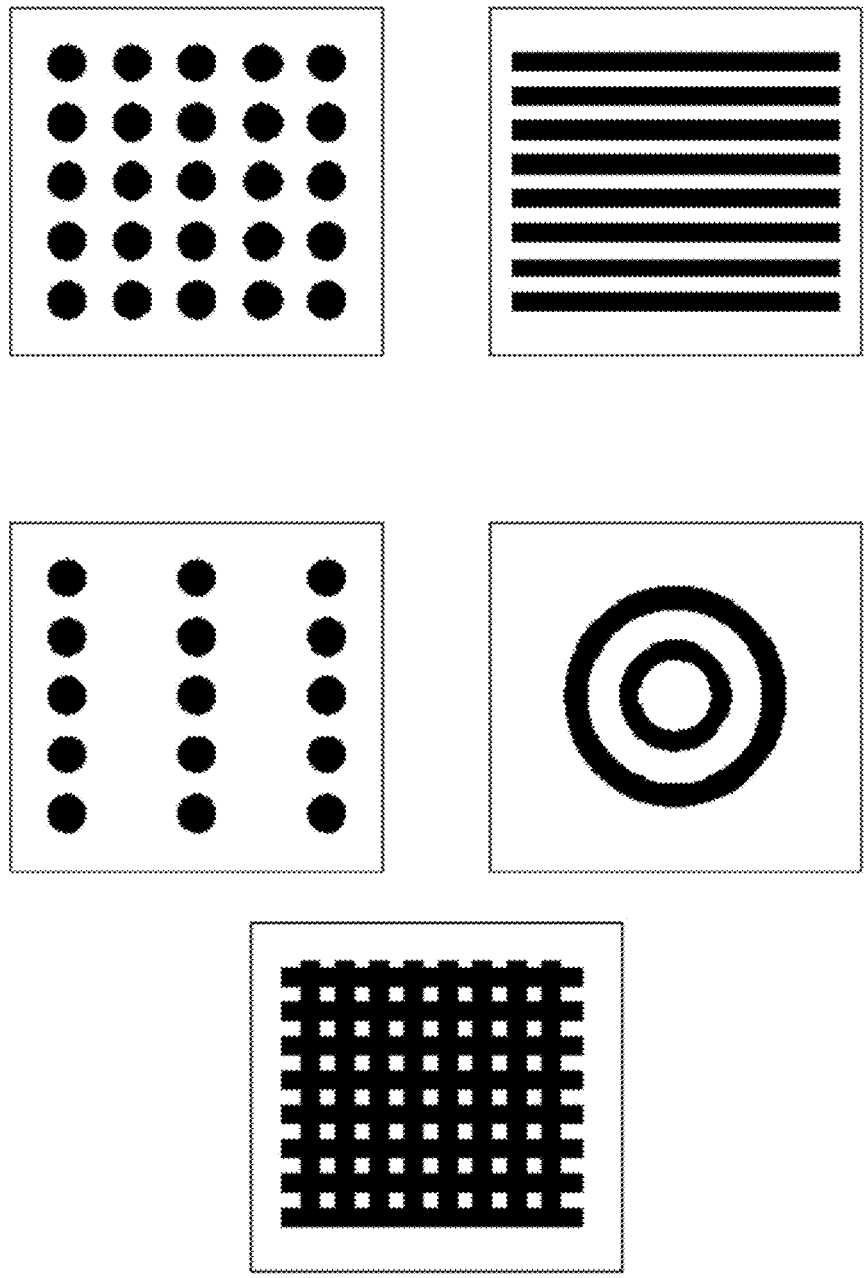
FIG. 3 shows examples of surface structures.

FIG. 3 shows examples of surface structures. The black regions are regions capable of forming elevations or depressions. The surface structure preferably consists of a multiplicity of structural elements. This makes for a larger change in the area of contact. Optimum spacing for individual structures depends on the polymer coating and the counterface.

The samples of an NiTi alloy (Memry, Bethel Conn., Table 1) were trimmed to a size of 3×7 mm. To remove the mechanical deformation layer, the sample surface was subjected to electrochemical polishing. After polishing, the samples were cooled down in liquid nitrogen (−196° C.) to ensure a completely martensitic phase.

To create the thermally switchable surface structures, an indenter was used to make impressions in the surface. A test body having a spherical geometry (ruby; 300 μm diameter) and a force of 10 N was chosen for this. The indentations were made in the surface in a 32×65 matrix (V-100_C1 hardness tester, Leco Instrumente, Mönchengladbach with Vickers indenter in diamond, Ahotec, Remscheid, Germany). The distance between two indentation midpoints was 200 μm.

Linear surface structures were introduced into the surface by scratching. To this end, the scratches were introduced into the surface in a line spacing of 60 μm using a constant force of 2 N (CSEM DT 322-01 micro-scratch tester). The indenter tip used for this was conically tapered with a tip radius of 5 μm and an opening angle of 90°.

To obtain a planar starting surface, the deformations were subsequently planarized. To this end, the samples were sanded off down to the ground of the impressions/scratches. The planarized NiTi surface was spin coated with polydimethylsiloxane (Sylgard 184, Dow Corning) in a ratio of 10:1 for base material to crosslinker, using a coating centrifuge. For this, the PDMS was first poured over the NiTi block and whizzed at 5000 rpm for 800 s or 200 s. The coatings obtained at the two times were similar. The coated sample was then oven dried at 40° C. for 48 hours and the layer thickness applied was determined using white light interferometry.

Samples were additionally prepared where the structure was produced using a Vickers indenter (10 N; 32×65) and a different time for whizzing. Table 2 shows an overview. The samples were indented at −50° C. in the case of the Vickers indenter.

The adhesion behavior of the shape memory alloy bearing the PDMS layer was characterized. This was done by testing the detachability of the polymer surface from a glass test body while measuring the bonding forces which arise.

To measure adhesion, the NiTi/PDMS samples were mounted on a heating platform and contacted with a glass test body. Once a certain level of preloading force is attained, sample and test body are separated again from each other. The forces which arise in the process are measured. To measure the force, the glass test body was glued to a glass spring of known spring constant and the deflection thereof was determined by interferometry. The test body used was a glass flat having an area of 2 mm$^2$ and a glass sphere having a diameter of 4 mm. To ensure that the measured results were comparable, the area of contact was arithmetically eliminated as a possible factor.

The measurements were carried out at various temperatures. The temperature was controlled using a voltage-controlled heating element positioned underneath the NiTi sample. The set-up of the heating platform is responsible for an approximately 20° C.-offset from heating element to sample. The measurements were each repeated 15 times. To show that the adhesion force returns to its original level following a distinct decrease in the course of heating, the sample was remeasured after cooling down.

Figure 4:
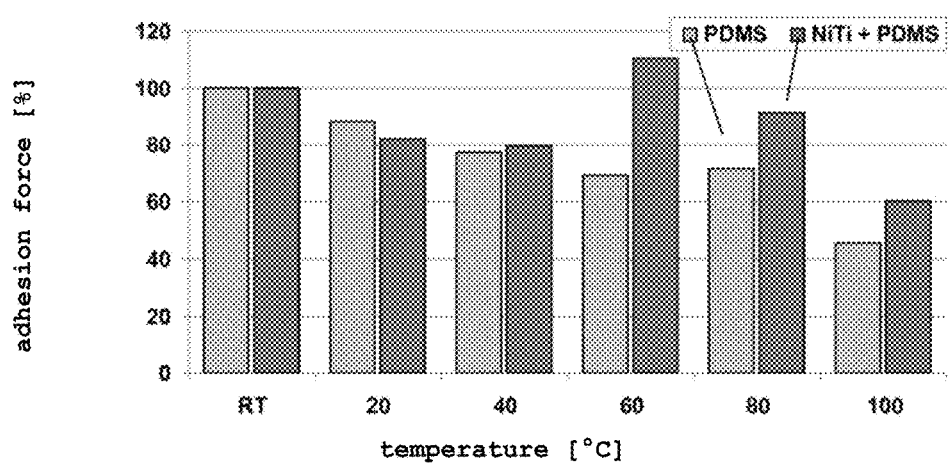
FIG. 4 shows a change in the adhesion force as a function of the temperature for pure PDMS (the left-hand bar in each pair) and PDMS-coated NiTi (6-8 μm in thickness; the right-hand bar in each pair)

Since the temperature and the formation of the structures change in the course of this measurement, the effect of the temperature change on the properties of the material were additionally analyzed in what follows. To this end, a further adhesion measurement was performed with a purely PDMS sample and an untreated NiTi/PDMS sample of nearly identical layer thickness to that of the NiTi/PDMS sample having reversible surface structuring. The adhesion force was measured for both samples during heating from room temperature (RT) to 100° C. at a 20° C. increment for 15 cycles of measurement each time (FIG. 4). It was found that there is a gradual decrease in adhesion force with increasing temperature.

A sample without polymer layer but with reversible surface structuring was not found to give a measurable change in adhesion.

Figure 5:
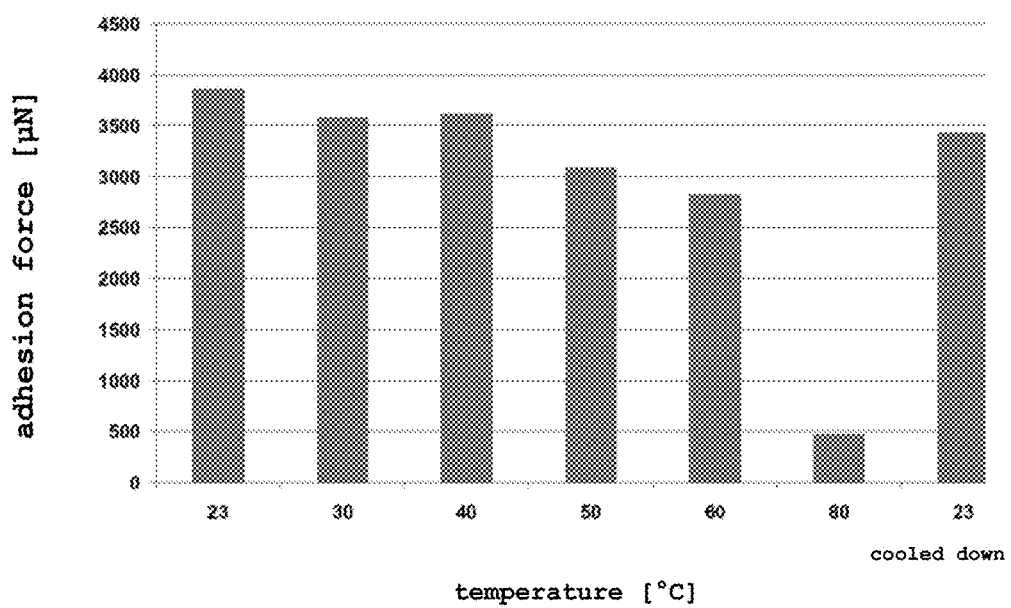
FIG. 5 shows the change in the adhesion for a sample having individual elevations as surface structure.

FIG. 5 shows the measurement of the temperature-dependent adhesion for a sample having individual elevations (sample 30). By 70° C. the adhesion has only decreased by about 27%. At 80° C. the adhesion force drops from 2700 μN to 400 μN (85% decrease). On renewed cooling, the original adhesion force almost completely recovers (3700 μN).

Comparative samples having a layer thickness of 33 μm PDMS were not found to give such a distinct decrease in the adhesion force. At this layer thickness of PDMS, the surface structure of the shape memory alloy no longer appears to be transmitted to the surface of the article.

Figure 6:
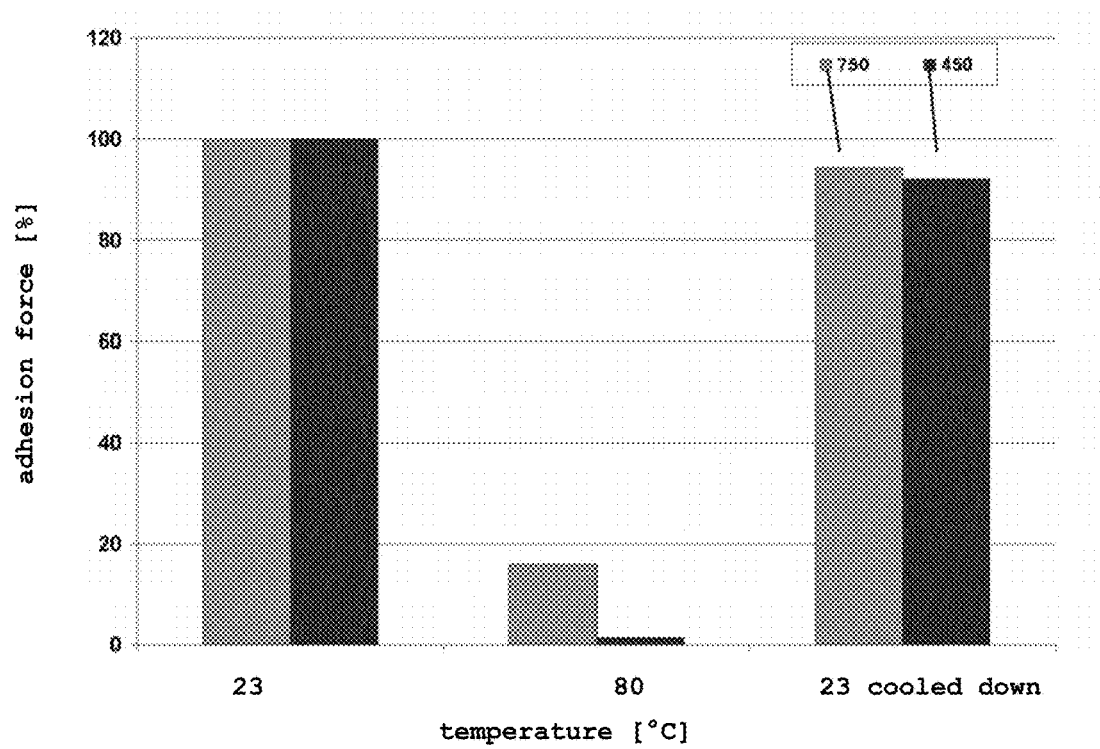
FIG. 6 shows the change in adhesion for two samples having individual elevations spaced apart by 450 μm (sample 40; the right-hand bar in each pair) and 750 μm (sample 50; the left-hand bar in each pair)

FIG. 6 shows the effect due to the spacing of the elevations. The decrease in adhesion force is found to be dependent on the spacing of the elevations. To wit, the decrease in the adhesion force is greater at a 450 μm spacing than for a greater spacing and also than for a smaller spacing of 200 μm. To measure the influence of the elevation, at least one elevation has to come into contact with the test body. If the test body is by virtue of its geometry able to fit in between adjacent structures, then the influence of the elevations on the adhesion is minimal.

Figure 7:
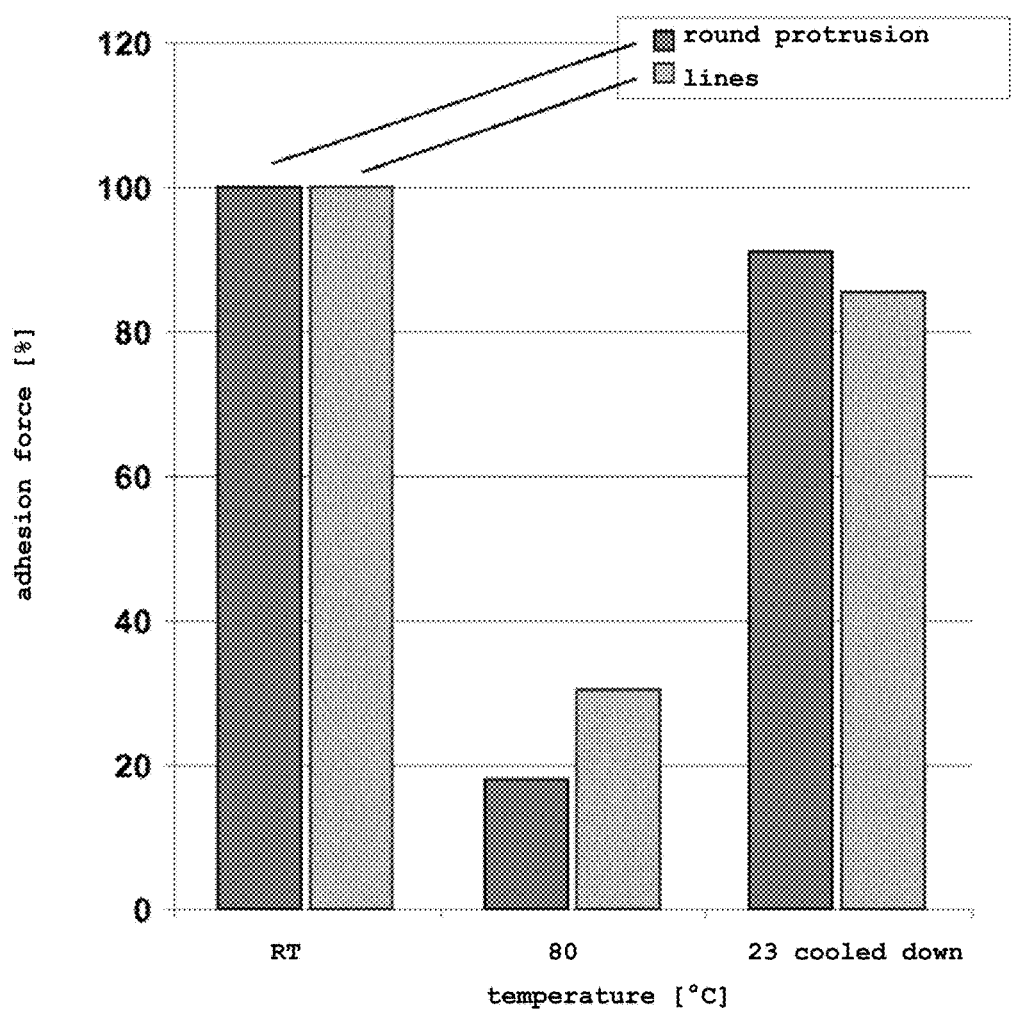
FIG. 7 shows the change in adhesion for a sample having individual elevations (sample 20; the left-hand bar in each pair) and lines (sample 60; the right-hand bar in each pair)

FIG. 7 shows the decrease in adhesion for individual elevations spaced apart by 200 μm versus lines spaced apart by 200 μm.

Figure 8:
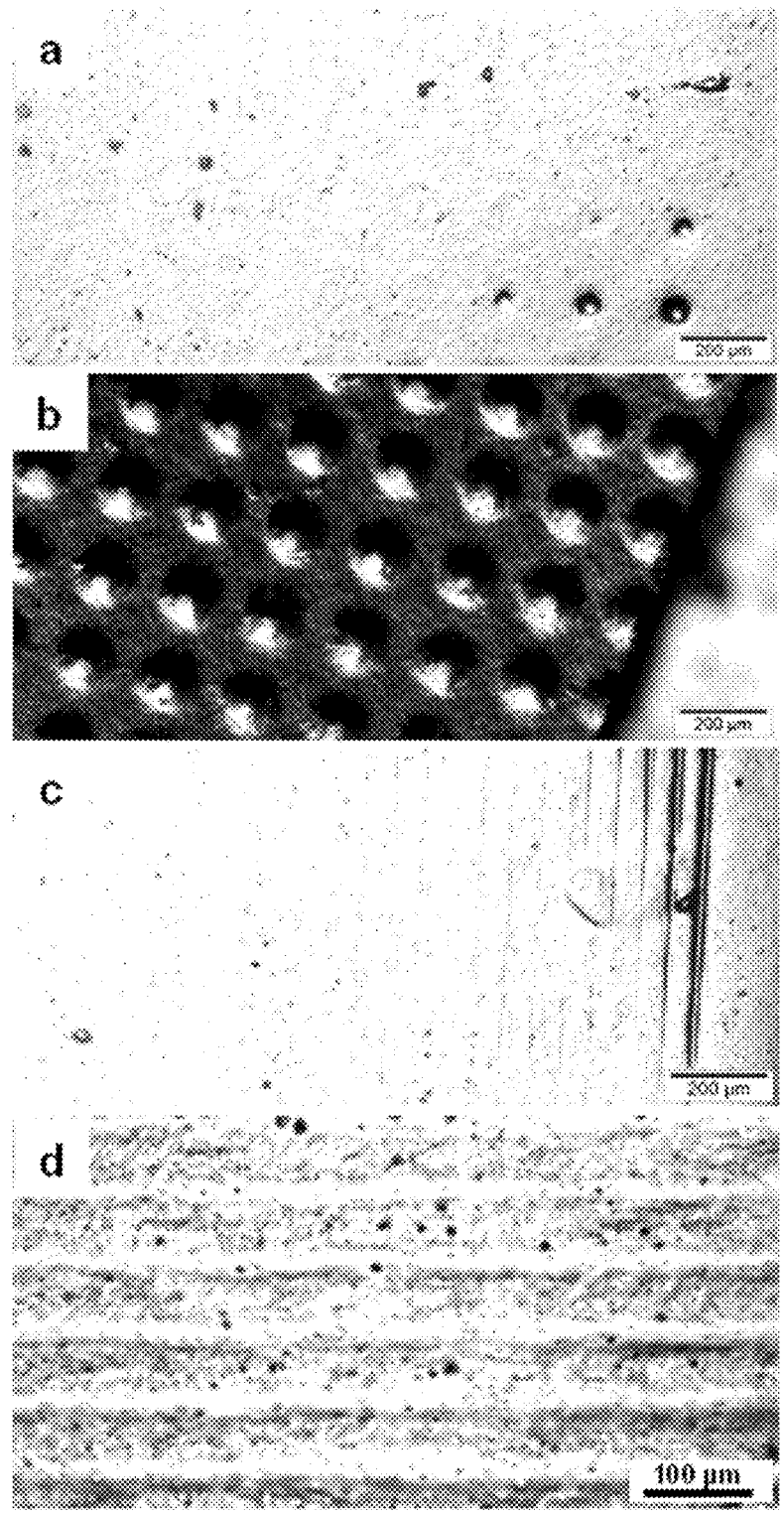
FIG. 8 shows optical micrographs of various samples from Figure 9 when cold (a, c) and at 84° C. (b, d).

FIG. 8 shows optical micrographs of the surface structures with circular and linear elevations at room temperature (a, c) and at 84° C. (b, d). The formation of the surface structure is clearly visible through the PDMS coating. The lines give a linear pattern having a height difference of 0.9

(+/−0.15) μm. The decrease in adhesion is 74% from 7.63 (+/−0.15) mN to 2.33 (+/−0.13) mN. After cooling, the adhesion is 83% restored.

TABLE 1

| Element | Sample weight [mg] | Dilution | Arithmetic mean [mg/l] | Concentration [wt %] |
|---|---|---|---|---|
| Ni | 39.790 | 1:100 | 4.415 +/− 0.053 | 55.479 +/− 0.669 |
| Ti | | | 3.367 +/− 0.051 | 42.310 +/− 0.645 |

TABLE 2

| Sample | Pattern | Indenter/ force | Spacing | Whizzing in seconds |
|---|---|---|---|---|
| 20 | individual elevations 32 × 65 matrix | spherical 300 μm/ 10N | 200 μm | 800 s |
| 30 | individual elevations 32 × 65 matrix | Vickers/ 10N | 200 μm | 200 s |
| 40 | individual elevations 15 × 15 matrix | Vickers/ 10N | 450 μm | 200 s |
| 50 | individual elevations 15 × 15 matrix | Vickers/ 10N | 750 μm | 200 s |
| 60 | lines | 2000 mN | 60 μm | 200 s |

REFERENCE SIGNS 201 shape memory alloy
203 polymer layer
205 counterface
207 surface structure

What is claimed is:

1. An article having at least one surface having switchable dry adhesion, wherein this surface comprises at least one shape memory alloy coated at least partly with at least one polymer,
    wherein the at least one shape memory alloy is capable of forming a surface structure changing the surface area available for dry adhesion,
    wherein the surface structure is a microtexture comprising a lateral dimension of 100 μm to below 500 μm and a height more than 0.5 μm.

2. The article as claimed in claim 1, wherein the coating of at least one polymer has a thickness of below 15 μm.

3. The article as claimed in claim 1, wherein the surface structure formed reduces the surface area available for adhesion.

4. The article as claimed in claim 1, wherein the shape memory alloy is capable of reversibly forming the surface structure.

5. The article as claimed in claim 1, wherein the shape memory alloy has a first structure at a first temperature and forms the surface structure at a second temperature.

6. The article as claimed in claim 5, wherein the first structure of the surface is a planar structure.

7. The article as claimed in claim 5, wherein the surface structure is formed by elevations or depressions.

8. The article as claimed in claim 1, wherein the surface is completely coated with the polymer.

9. The article as claimed in claim 1, wherein the shape memory alloy comprises nickel and titanium.

10. A separable dry-adhesive bond comprising the article as claimed in claim 1.

11. The article as claimed in claim 1, wherein the article contains no adhesive.

12. The article as claimed in claim 1, wherein the at least one polymer comprises silicone.

13. The article as claimed in claim 1, wherein the at least one polymer comprises polydimethylsiloxane.

14. The article as claimed in claim 1, wherein the shape memory alloy comprises a copper-zinc-aluminum alloy, a copper-zinc-aluminum-nickel alloy, a nickel-manganese-gallium alloy, or a copper-aluminum-nickel alloy.

15. The article as claimed in claim 1, wherein the coating of at least one polymer has a thickness of below 10 μm.

16. An article, comprising:
    an article having at least one surface having switchable dry adhesion, said at least one surface comprising at least one shape memory alloy coated at least partly with at least one polymer,
    wherein the at least one shape memory alloy forms a surface structure, thereby changing a surface area available for dry adhesion,
    wherein the article contains no adhesive,
    wherein the surface structure is a microtexture comprising a lateral dimension of 100 μm to below 500 μm and a height more than 0.5 μm.

* * * * *